United States Patent
Fender et al.

(10) Patent No.: US 10,864,870 B2
(45) Date of Patent: Dec. 15, 2020

(54) BUMPER CROSS BEAM

(71) Applicant: Bayerische Motoren Werke Aktiengesellschaft, Munich (DE)

(72) Inventors: Johannes Fender, Munich (DE); Niko Fontein, Unterschleissheim (DE); Simon Hesse, Wielenbach (DE); Lennart Keuthage, Munich (DE); Gerald Scheidacker, Hohenwart (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 35 days.

(21) Appl. No.: 16/286,860

(22) Filed: Feb. 27, 2019

(65) Prior Publication Data

US 2019/0193657 A1  Jun. 27, 2019

Related U.S. Application Data

(63) Continuation of application No. PCT/EP2017/071534, filed on Aug. 28, 2017.

(30) Foreign Application Priority Data

Aug. 30, 2016 (DE) ............. 10 2016 216 317.5

(51) Int. Cl.
*B60R 19/18* (2006.01)
*B60R 19/02* (2006.01)
*B60R 19/12* (2006.01)

(52) U.S. Cl.
CPC ............ *B60R 19/18* (2013.01); *B60R 19/023* (2013.01); *B60R 19/12* (2013.01); *B60R 2019/186* (2013.01); *B60R 2019/1813* (2013.01); *B60R 2019/1866* (2013.01)

(58) Field of Classification Search
CPC ....... B60R 19/18; B60R 19/023; B60R 19/12; B60R 2019/182; B60R 2019/1813
USPC ........................................... 293/102
See application file for complete search history.

(56) References Cited

U.S. PATENT DOCUMENTS

| | | |
|---|---|---|
| 2003/0155806 A1 | 8/2003 | Goto et al. |
| 2005/0248164 A1 | 11/2005 | Kimura et al. |
| 2007/0039282 A1* | 2/2007 | Holl ................... E04C 3/28 52/843 |

(Continued)

FOREIGN PATENT DOCUMENTS

| | | |
|---|---|---|
| CN | 102180136 A | 9/2011 |
| DE | 195 09 541 A1 | 9/1996 |

(Continued)

OTHER PUBLICATIONS

Machine Translation of JP4057815B2, printed from the JPO website, May 25, 2020.*

(Continued)

*Primary Examiner* — Jason S Morrow
(74) *Attorney, Agent, or Firm* — Crowell & Moring LLP

(57) ABSTRACT

A bumper cross beam connects to a body of a motor vehicle, in particular connects directly or indirectly to a left longitudinal beam and a right longitudinal beam. The bumper cross beam has a hollow profile base carrier which is reinforced on the front exterior in the travel direction by a front U-profile carrier element. A non-free limb of the front U-profile carrier element is spaced apart from a front side of the hollow profile base carrier.

14 Claims, 3 Drawing Sheets

(56) References Cited

U.S. PATENT DOCUMENTS

| | | | |
|---|---|---|---|
| 2008/0217934 A1* | 9/2008 | Hori | B60R 19/18 293/102 |
| 2009/0267368 A1* | 10/2009 | Hashimura | B60R 19/18 293/132 |
| 2011/0121585 A1* | 5/2011 | Loveborn | B60R 19/18 293/102 |
| 2012/0153645 A1 | 6/2012 | Roll et al. | |
| 2013/0168982 A1 | 7/2013 | Ashiya et al. | |
| 2016/0114747 A1* | 4/2016 | Ishitobi | B60R 19/18 293/120 |
| 2016/0244013 A1* | 8/2016 | Mori | B60R 19/18 |

FOREIGN PATENT DOCUMENTS

| | | | |
|---|---|---|---|
| DE | 103 05 185 A1 | 9/2003 | |
| DE | 10 2010 054 638 A1 | 6/2012 | |
| DE | 10 2011 008 860 A1 | 7/2012 | |
| EP | 2 113 423 A1 | 11/2009 | |
| EP | 2 508 395 A1 | 10/2012 | |
| JP | 4057815 B2 * | 3/2008 | B60R 19/18 |

OTHER PUBLICATIONS

International Search Report (PCT/ISA/210) issued in PCT Application No. PCT/EP2017/071534 dated Nov. 6, 2017 with English translation (six (6) pages).
German-language Written Opinion (PCT/ISA/237) issued in PCT Application No. PCT/EP2017/071534 dated Nov. 6, 2017 (six (6) pages).
German-language Search Report issued in counterpart German Application No. 10 2016 216 317.5 dated Jun. 23, 2017 with partial English translation (15 pages).

* cited by examiner

BUMPER CROSS BEAM

CROSS REFERENCE TO RELATED APPLICATIONS

This application is a continuation of PCT International Application No. PCT/EP2017/071534, filed Aug. 28, 2017, which claims priority under 35 U.S.C. § 119 from German Patent Application No. 10 2016 216 317.5, filed Aug. 30, 2016, the entire disclosures of which are herein expressly incorporated by reference.

BACKGROUND AND SUMMARY OF THE INVENTION

The present invention relates to a bumper cross beam for connecting to a body of a motor vehicle.

A bumper cross beam for a motor vehicle is known, for example from DE 10 2010 054 638 A1. The bumper cross bream comprises two separate hollow profiles, which rest on each other on a longitudinal wall and are connected to each other. The two hollow profiles extend in the vehicle transverse direction and are connected to each other by means of welded connections. A U-shaped reinforcing component engages around the two hollow profiles from the rear side. The bumper cross beam is fixed to longitudinal beams of the vehicle body via crash boxes.

The object of the present invention is to provide a bumper cross beam which, while taking account of the lowest possible weight, has adequate strength and flexural rigidity in the event of a collision with a pole or the like.

This object is achieved by a bumper cross beam for connecting to a body of a motor vehicle comprising a hollow profile base carrier and a front U-profile carrier element which reinforces the hollow profile base carrier on a front exterior in a direction of travel. A non-free limb of the front U-profile carrier is formed so as to be spaced apart from a front side of the hollow profile base carrier.

The bumper cross beam according to the invention is designed for connecting to a body of a motor vehicle, in particular for connecting directly or indirectly to a left longitudinal beam and a right longitudinal beam. The bumper cross beam has a hollow profile base carrier which, in the direction of travel, is reinforced on the front exterior with a front U-profile carrier element. A non-free limb of the front U-profile carrier element is designed to be spaced apart from a front side of the hollow profile base carrier.

The spacing between the front U-profile carrier element and the hollow profile base carrier constitutes an additional deformation path, according to the dimension of the spacing, before the collision force at the impact point acts in a concentrated manner as a bending moment on the bumper cross beam, in particular the hollow profile base carrier, in the event of a collision with, for example, a pole, tree or the like, i.e. a rigid and narrow obstacle. In this way, it is possible for premature failure of the bumper cross beam as a result of tearing of the hollow profile base carrier to be prevented with a comparatively low overall weight of the bumper cross beam.

According to a preferred development of the bumper cross beam according to the invention, free limbs of the front U-profile carrier element are fixed to an upper side and an underside of the hollow profile base carrier. In other words, the upper free limb of the front U-profile carrier element is fixed to the upper side of the hollow profile base carrier, and the lower free limb of the front U-profile carrier element is fixed to the underside of the hollow profile base carrier.

The hollow profile base carrier is preferably a longitudinal profile with a closed hollow profile. Particularly preferably, the closed hollow profile is implemented seamlessly in order to increase flexural rigidity with the lowest possible weight.

According to a preferred development of the bumper cross beam according to the invention, the non-free limb of the front U-profile carrier element is spaced apart by 10 to 50 mm, preferably 15 to 25 mm, for example approximately 18 mm, from the front side of the hollow profile base body in a region of the bumper cross beam central in the vehicle cross direction, in particular exactly in the center in relation to the vehicle cross direction. The great length of the overall cross section in the vehicle longitudinal direction that is achieved as a result increases resistance with respect to flexural deformation.

The non-free limb can be spaced apart substantially constantly from the hollow profile base carrier over its entire length.

However, it is also possible that the distance varies in the vehicle cross direction and tends virtually toward zero in lateral regions of the front U-profile carrier element. Since the flexural loading of the bumper cross beam in the event of a collision is highest in the central region thereof, in this position the spacing of the front U-profile carrier element and the bending resistance therefore present is most effective and therefore also more necessary than in lateral regions of the bumper cross beam and in regions of the bumper cross beam close to body attachment sections explained below.

Preferably, the bumper cross beam is connectable to the body of the motor vehicle via a left body attachment section and a right body attachment section. In particular, the bumper cross beam is preferably connectable indirectly or directly to a left longitudinal beam and a right longitudinal beam of the body of the motor vehicle. Indirectly means the bumper cross beam is connected to the longitudinal beams via additional deformation elements, which are also called crash boxes.

According to a preferred development, the front U-profile carrier element extends at least from the left body attachment section as far as the right body attachment section of the bumper cross beam. In other words, the front U-profile carrier element is arranged substantially in the region between the left and right body attachment sections.

This has in particular the advantage in the loading condition in which the motor vehicle strikes the pole, the tree or the like, i.e. the rigid and narrow obstacle, centrally. Here, the greatest bending moment acts on the bumper cross beam, which in turn is supported in a weight-optimized manner by the centrally arranged front U-profile carrier element and the distance of the non-free limb of the front U-profile carrier element from the central section of the hollow profile base carrier.

Preferably, the hollow profile base carrier has a chamber with a closed cross section, which extends in the vehicle cross direction. Alternatively, the hollow profile base carrier can also have two or more chambers with a closed cross section which extend in the vehicle cross direction. The two or more chambers can preferably be arranged above one another.

In this way, flexural rigidity and strength of the hollow profile base carrier and of the bumper cross beam is likewise increased with low weight.

The hollow profile base carrier can be composed of a single tube with a substantially rectangular or polygonal cross section. The hollow profile base carrier can, however, also be composed of two or more tubes. In this case, the tubes can, for example, be connected integrally to one another at the front in the direction of travel or at the rear in the direction of travel or at the front in the direction of travel and at the rear in the direction of travel. An integral connection of the several separately produced tubes only at their front side is preferred, since the front side of the hollow profile base carrier is stressed least during the frontal collision (in particular in comparison with the rear side of the hollow profile base carrier), and at this position weakening of the hollow profile base carrier as a result of the integral connection, such as the welded connection, is lowest.

The hollow profile base carrier can extend over an entire length of the bumper cross beam. Alternatively, the hollow profile base carrier can also extend only between the two body attachment sections of the bumper cross beam.

The hollow profile base carrier element or the hollow profile base carrier elements can be produced by hydroforming or by extrusion.

In this way, it is simply possible to provide a seamless hollow profile base carrier. In addition, by means of the hydroforming, the cross section over a length of the hollow profile cross beam can be configured to be suitably variable.

The hollow profile carrier preferably has a cross section that is longer in the direction of travel in its central region than in its regions close to the body attachment sections.

According to a preferred development, a rear U-profile carrier element can also be fixed to the hollow profile base carrier. A non-free limb of the rear U-profile carrier element can be arranged opposite a rear side of the hollow profile base carrier. For example, free limbs of the rear U-profile carrier element can be fixed to an upper side or an underside of the hollow profile base carrier.

The free limbs of the front U-profile carrier element and the free limbs of the rear U-profile carrier element can be formed in such a way that they butt against each other and can be fixed to each other by a welded connection.

The non-free limb of the rear U-profile carrier element is preferably formed adjacent to the rear side of the hollow profile base carrier. Adjacent means that there is substantially no gap between the rear U-profile carrier element and the rear side of the hollow profile base carrier. Furthermore, the free limbs of the rear U-profile carrier element can be formed adjacent to the upper side and the underside of the hollow profile base carrier.

According to a preferred development, channel-like depressions, which can also be called creases, in the vehicle longitudinal direction are introduced on an upper side and/or an underside of the hollow profile base carrier. The depth of the channel-like depressions can be designed to decrease in the vehicle longitudinal direction. In this way, a buckling resistance of the bumper cross beam in the vehicle longitudinal direction can be increased further. In the event of deformation of the bumper cross beam or of the hollow profile base carrier, the channel-like depressions counteract the deformation and therefore make premature failure of the bumper cross beam as a result of buckling more difficult. Flexural rigidity of the carrier is thus maintained during collision-induced deformation.

The hollow profile base carrier and/or the front U-profile carrier element can be formed from a high strength steel.

The aforementioned developments of the invention can be combined with one another as desired, if possible and expedient.

Other objects, advantages and novel features of the present invention will become apparent from the following detailed description of one or more preferred embodiments when considered in conjunction with the accompanying drawings.

DETAILED DESCRIPTION OF THE DRAWINGS

There follows a more detailed description of an exemplary embodiment of the present invention with reference to FIGS. 1 to 5.

Figure 1:
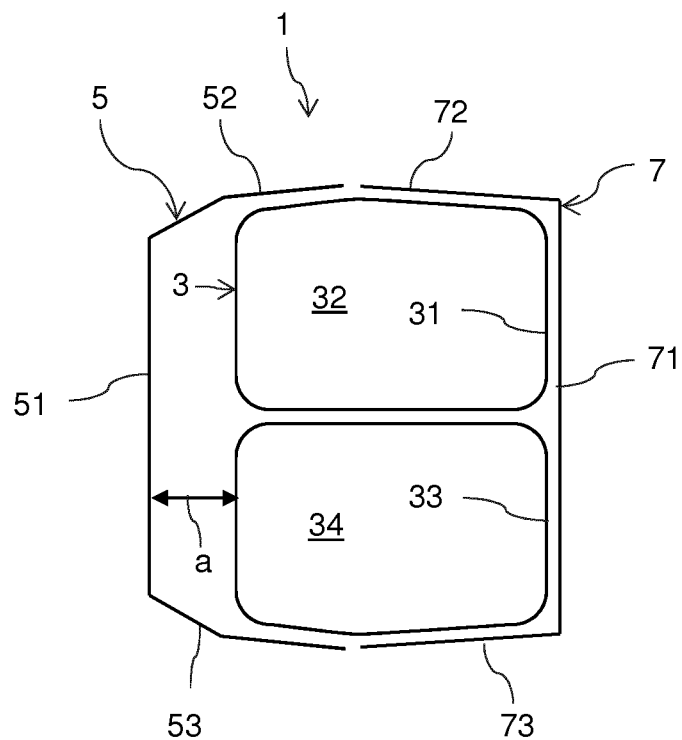
FIG. 1 is a schematic sectional view along the plane A-A shown in FIG. 2 of a bumper cross beam according to an exemplary embodiment of the present invention.

A sectional view of the bumper cross beam 1 according to the exemplary embodiment of the present invention is shown in FIG. 1. The bumper cross beam 1 has a hollow profile base carrier 3, which is composed of two hollow profile base carrier elements 31 and 33, which extend over an entire width of the bumper cross beam 1 in the vehicle transverse direction. The hollow profile base carrier elements 31, 33 are profiles with closed cross sections, which are produced seamlessly. In particular, the hollow profile base carrier elements 31 and 33 are produced seamlessly by a hydroforming process. The cross section of the hollow profile base carrier elements can be designed to be constant over the width of the bumper cross beam. In the present exemplary embodiment, the cross section of the hollow profile carrier elements 31, 33 is designed to be variable over a length of the bumper cross beam 1. In the center of the bumper cross beam 1, based on a vehicle transverse direction, the hollow profile carrier elements 31, 33 are longest in the vehicle longitudinal direction, while the hollow profile carrier elements 31, 33 are shorter in the vehicle longitudinal direction with increasing distance from the center. This is advantageous from the point of view of optimizing weight and the different flexural stresses of the bumper cross beam 1 over the vehicle transverse direction. The two hollow profile base carrier elements 31 and 33 each have a hollow chamber 32 and 34 respectively. The two hollow profile base carrier elements 31 and 33 are connected to each other by welding, at least on the front side of the hollow profile base carrier 3.

Figure 3:
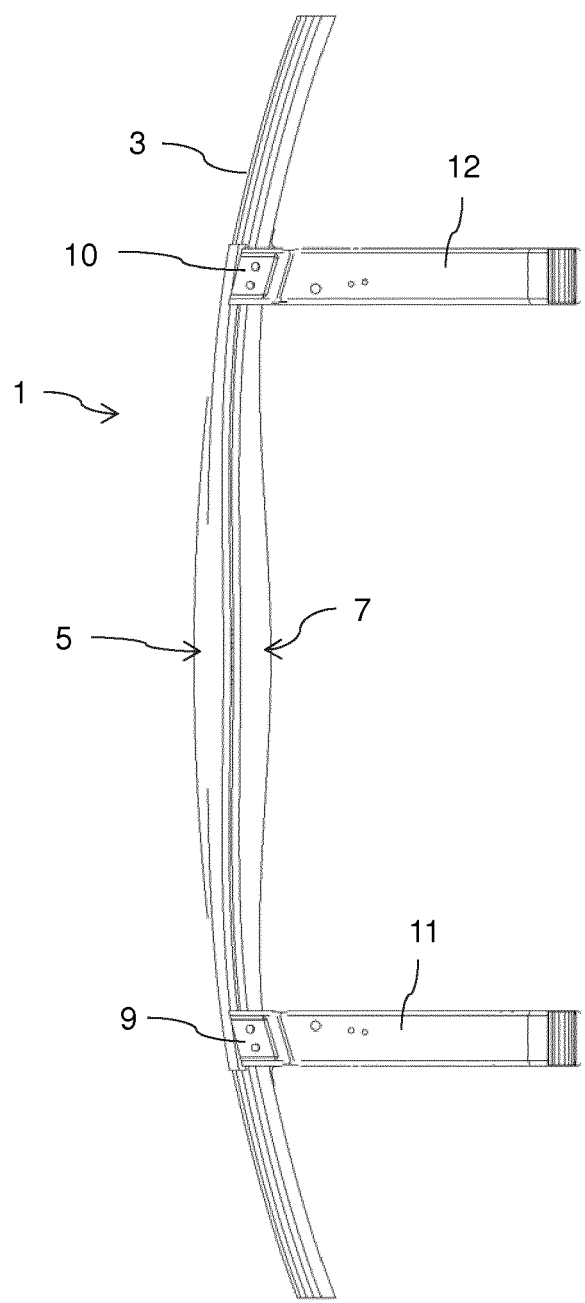
FIG. 3 is a schematic plan view of the bumper cross beam according to the exemplary embodiment of the present invention with body attachment sections.
Figure 4:
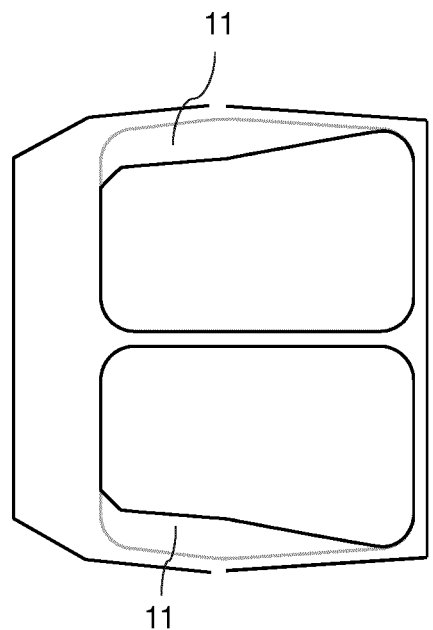
FIG. 4 is a schematic sectional view of the bumper cross beam according to the exemplary embodiment of the present invention in the region of channel-like depressions.
Figure 5:
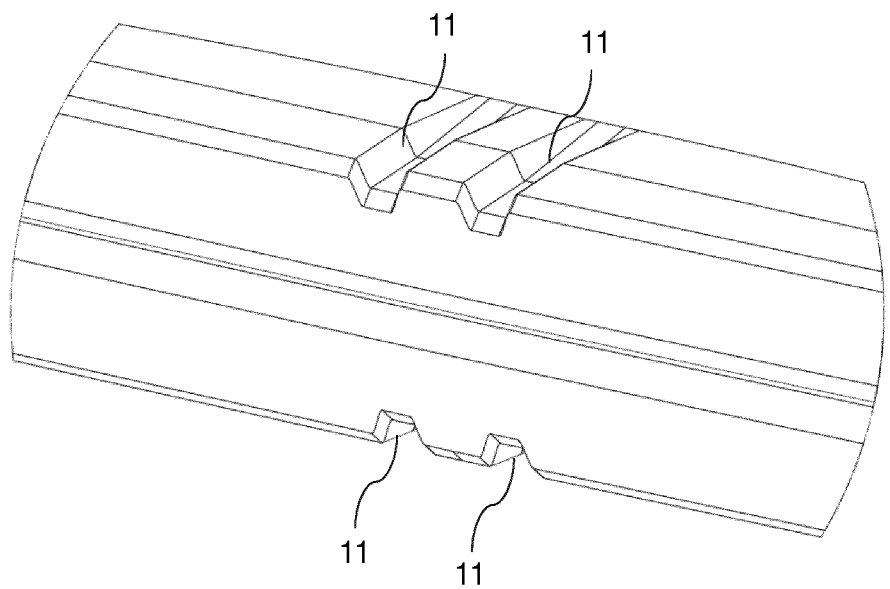
FIG. 5 is a schematic perspective view of part of the hollow profile base carrier of the bumper cross beam according to the exemplary embodiment of the present invention with the channel-like depressions.

A front U-profile carrier element 5 is fixed to the front side of the hollow profile base carrier 1. A non-free limb 51 of the U-profile carrier element 5 is spaced apart from the front side of the hollow profile base carrier 3 by the distance "a." The distance "a" can be, for example, 10 to 50 mm, preferably 15 to 25 mm, for example 18 mm. The distance "a" can be designed to be constant over the entire width of the front U-profile carrier element 5. In the present exemplary embodiment, however, the distance "a" in the center—based on the vehicle transverse direction—of the bumper cross beam 1 is greatest and reduces continuously in the direction of a left body attachment section 9 and right body attachment section 10, which are shown in FIG. 3. The free limbs 52 and 53 of the front U-profile carrier element 5 are fixed to an upper side and an underside, respectively, of the hollow profile base carrier 3 by welding.

In addition, the bumper cross beam 1 has a rear U-profile carrier element 7, the non-free limb 71 of which is formed with no or a short spacing from a rear side of the hollow profile base carrier 3. Free limbs 72 and 73 of the rear U-profile carrier element 7 engage around the hollow profile base carrier 3 and, just like the free limbs 52 and 53 of the front U-profile carrier element 5, are fixed to the upper side and the underside of the hollow profile base carrier 3 by welding. In particular, the free limbs 52 and 72 can be fixed to the upper side of the hollow profile base carrier 3 by a single weld, and the free limbs 53 and 73 can be fixed to the underside of the hollow profile base carrier 3 by a single weld. However, the free limbs 52 and 72 can also be fixed to the upper side of the hollow profile base carrier 3 by separate welds. The same is true of the free limbs 53 and 73.

Figure 2:
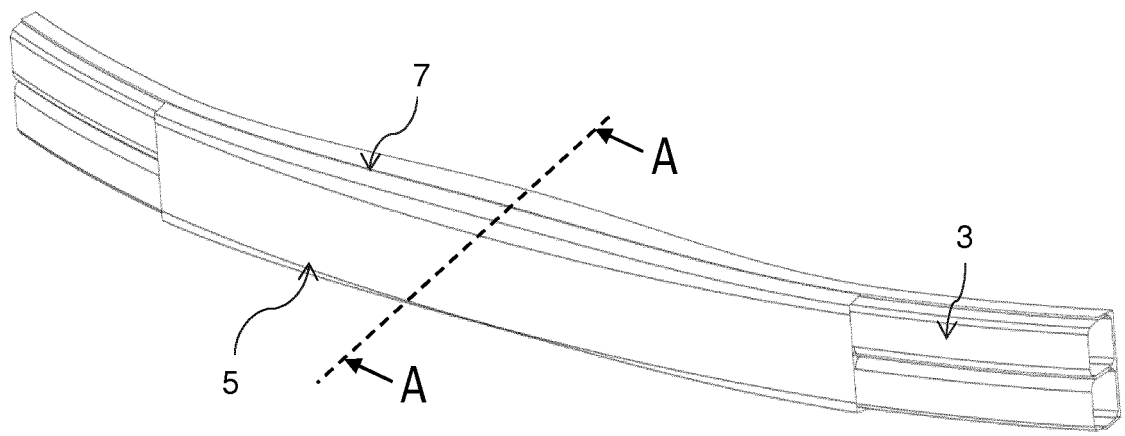
FIG. 2 is a schematic perspective view of the bumper cross beam according to the exemplary embodiment of the present invention.

FIG. 2 shows a schematic perspective view of the bumper cross beam 1 according to the exemplary embodiment of the present invention. As is shown in FIG. 2, the hollow profile base carrier 3 and the rear U-profile carrier element 7 extend over an entire width of the bumper cross beam 1. By contrast, the front U-profile carrier element 5 extends only over a central region of the bumper cross beam 1.

As shown in the plan view of FIG. 3, the bumper cross beam 1 is connected via a left body attachment section 9 and a right body attachment section 10 by corresponding deformation elements (also called crash boxes) 11 and 12 to left and right longitudinal beams of the body of the motor vehicle, not shown. The front U-profile carrier element 5 extends in a region from the left body attachment section 9 to the right body attachment section 10.

In order to maintain the flexural rigidity during the deformation by increasing the buckling resistance of the bumper cross beam 1, channel-like depressions 11, which can also be designated creases, can be introduced into the hollow profile base carrier 3. The channel-like depressions 11 extend in particular in the vehicle longitudinal direction on an upper side and/or an underside of the hollow profile base carrier 3. The channel-like depressions 11 have a depth that reduces continuously in the vehicle longitudinal direction.

The bumper cross beam 1 according to the first exemplary embodiment has in particular an advantageous function in a collision loading condition, in which the vehicle strikes a rigid, comparatively narrow barrier, such as a pole or a tree, centrally with the bumper cross beam. In this case, particularly high bending moments act on the bumper cross beam, there being the risk of failure of the cross beam as a result of tearing. As a result of the implementation of the bumper cross beam 1 with the front U-profile carrier element 5, which in particular is formed so as to be spaced apart centrally from the hollow profile base carrier 3, an additional deformation path is created, which prevents direct bending stress of the bumper cross beam with a high level of load as a result of the collision. In addition, building up the hollow profile base carrier from two seamlessly shaped hollow profile base carrier elements 31, 33 and also the rear U-profile carrier element contributes to improved flexural rigidity with an overall weight of the bumper cross beam 1 that is relatively low. Overall, the bumper cross beam 1 according to the exemplary embodiment can be implemented in a weight-optimized manner with regard to the loading situation described.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bumper cross beam for connecting to a body of a motor vehicle, comprising:
    a hollow profile base carrier;
    a front U-profile carrier element which reinforces the hollow profile base carrier on a front exterior in a direction of travel; and
    a rear U-profile carrier element that is fixed to the hollow profile base carrier, wherein
        a non-free limb of the front U-profile carrier element is formed so as to be spaced apart from a front side of the hollow profile base carrier.

2. The bumper cross beam as claimed in claim 1, wherein free limbs of the front U-profile carrier element are fixed to an upper side and an underside of the hollow profile base carrier, respectively.

3. The bumper cross beam as claimed in claim 1, wherein the non-free limb of the front U-profile carrier element is spaced apart by 10 to 50 mm from the front side of the hollow profile base carrier in a region of the bumper cross beam central in a vehicle transverse direction.

4. The bumper cross beam as claimed in claim 1, wherein the non-free limb of the front U-profile carrier element is spaced apart by 15 to 25 mm from the front side of the hollow profile base carrier in a region of the bumper cross beam central in a vehicle transverse direction.

5. The bumper cross beam as claimed in claim 1, wherein the bumper cross beam is connectable to the body of the motor vehicle via a left body attachment section and a right body attachment section, and
    the front U-profile carrier element extends at least from the left body attachment section as far as the right body attachment section of the bumper cross beam.

6. The bumper cross beam as claimed in claim 1, wherein the hollow profile base carrier has a chamber with a closed cross section, which extends in a vehicle transverse direction.

7. The bumper cross beam as claimed in claim 1, wherein the hollow profile base carrier has several chambers with a closed cross section, which extend in a vehicle transverse direction and are arranged above one another.

8. The bumper cross beam as claimed in claim 1, wherein the hollow profile base carrier is composed of a hollow profile base carrier element.

9. The bumper cross beam as claimed in claim 1, wherein the hollow profile base carrier is composed of several separately produced hollow profile base carrier elements, which are connected integrally to each other.

10. The bumper cross beam as claimed in claim 8, wherein
    the hollow profile base carrier element is produced by hydroforming or by extrusion.

11. The bumper cross member as claimed in claim 1, further comprising:
    a non-free limb of the rear U-profile carrier element is opposite a rear side of the hollow profile base carrier, wherein
    free limbs of the rear U-profile carrier element are fixed to an upper side and an underside of the hollow profile base carrier, respectively.

12. The bumper cross beam as claimed in claim 11, wherein a non-free limb of the rear U-profile carrier element is formed adjacent to the rear side of the hollow profile base carrier, and free limbs of the rear U-profile carrier element are formed adjacent to the upper side and the underside of the hollow profile base carrier, respectively.

13. The bumper cross beam as claimed in claim 1, further comprising:

channel-like depressions in a vehicle longitudinal direction in an upper side and/or an underside of the hollow profile base carrier.

14. The bumper cross beam as claimed in claim 1, wherein the hollow profile base carrier and/or the front U-profile carrier element is/are formed from a high strength steel.

* * * * *